United States Patent
Gupta et al.

(10) Patent No.: US 9,477,528 B2
(45) Date of Patent: *Oct. 25, 2016

(54) SYSTEM AND METHOD FOR PROVIDING A REST-BASED MANAGEMENT SERVICE IN A TRAFFIC DIRECTOR ENVIRONMENT

(71) Applicant: ORACLE INTERNATIONAL CORPORATION, Redwood Shores, CA (US)

(72) Inventors: Amit Gupta, Bangalore (IN); Praveen Chandrasekharan, Bangalore (IN)

(73) Assignee: ORACLE INTERNATIONAL CORPORATION, Redwood Shores (*) Notice: Subject to any disclaimer, the term of this patent is extended or adjusted under 35 U.S.C. 154(b) by 0 days.

This patent is subject to a terminal disclaimer.

(21) Appl. No.: 14/295,874

(22) Filed: Jun. 4, 2014

(65) Prior Publication Data
US 2014/0289838 A1    Sep. 25, 2014

Related U.S. Application Data

(63) Continuation of application No. 13/627,646, filed on Sep. 26, 2012, now Pat. No. 8,782,769.

(60) Provisional application No. 61/539,886, filed on Sep. 27, 2011, provisional application No. 61/539,900, filed on Sep. 27, 2011.

(51) Int. Cl.
*G06F 7/04* (2006.01)
*G06F 9/50* (2006.01)
(Continued)

(52) U.S. Cl.
CPC ............ *G06F 9/505* (2013.01); *G06F 9/4443* (2013.01); *G06F 9/45512* (2013.01);
(Continued)

(58) Field of Classification Search
CPC . H04L 41/08; H04L 63/0884; G06F 9/4443; G06F 9/45512; G06F 9/505; G06F 9/5072
See application file for complete search history.

(56) References Cited

U.S. PATENT DOCUMENTS 6,560,717 B1   5/2003   Scott
6,658,000 B1   12/2003  Raciborski et al.
(Continued)

FOREIGN PATENT DOCUMENTS

CN    1251669 A    4/2000
CN    1444813 A    9/2003
(Continued)

OTHER PUBLICATIONS

Gouthaman, et al., Oracle Traffic Director, Administrators Guide, 11g Release1, Aug. 2013, 312 pages, Oracle International Corporation.
Unknown Author, Health Checks Overview, Chapter 4, Health Checks, Jun. 2009, 4-1-4-76, Brocade Communication Systems.
(Continued)

*Primary Examiner* — Shewaye Gelagay
*Assistant Examiner* — Khoi Le
(74) *Attorney, Agent, or Firm* — Tucker Ellis LLP

(57) ABSTRACT

Described herein are systems and methods for providing software administration tools, for use in administering server configurations, such as in a traffic director or other type of server environment. In accordance with an embodiment, the system comprises a traffic director having one or more traffic director instances, which is configured to receive and communicate requests, from clients, to origin servers having one or more pools of servers. An administration server can be used to manage the traffic director, including a REpresentational State Transfer (REST) infrastructure and management service which maps REST calls to mbeans or other management components registered on the administration server, for use in managing the traffic director.

15 Claims, 4 Drawing Sheets

(51) Int. Cl.

| | | |
|---|---|---|
| G06F 17/27 | (2006.01) | |
| G06F 9/44 | (2006.01) | |
| G06F 9/455 | (2006.01) | |
| G06F 11/20 | (2006.01) | |
| H04L 29/08 | (2006.01) | |
| H04L 12/24 | (2006.01) | |
| H04L 29/06 | (2006.01) | |

(52) U.S. Cl.
CPC ........ *G06F 11/2041* (2013.01); *G06F 17/276* (2013.01); *H04L 41/08* (2013.01); *H04L 63/0853* (2013.01); *H04L 67/1008* (2013.01)

(56) References Cited

U.S. PATENT DOCUMENTS

| | | |
|---|---|---|
| 6,691,244 B1 | 2/2004 | Kampe |
| 6,701,438 B1* | 3/2004 | Prabandham ....... H04L 63/1425 707/999.01 |
| 6,880,156 B1 | 4/2005 | Landherr |
| 7,099,915 B1 | 8/2006 | Tenereillo |
| 7,158,926 B2* | 1/2007 | Kampe ................ G06F 11/008 703/2 |
| 7,289,445 B2 | 10/2007 | Illikkal |
| 7,321,926 B1 | 1/2008 | Zhang |
| 7,370,083 B2 | 5/2008 | Husain |
| 7,395,355 B2 | 7/2008 | Afergan |
| 7,437,549 B2 | 10/2008 | Lindqvist et al. |
| 7,616,625 B1 | 11/2009 | Un |
| 7,619,545 B2 | 11/2009 | Samuels |
| 7,664,948 B2* | 2/2010 | Moreau ............... H04L 63/0823 713/156 |
| 7,849,368 B2 | 12/2010 | Srivastava |
| 8,059,653 B1 | 11/2011 | Wang |
| 8,230,336 B2 | 7/2012 | Morrill |
| 8,260,757 B1 | 9/2012 | Chatterjee |
| 8,693,981 B1 | 4/2014 | Anugu |
| 8,782,769 B2 | 7/2014 | Gupta et al. |
| 2001/0049732 A1 | 12/2001 | Raciborski |
| 2001/0049741 A1 | 12/2001 | Skene et al. |
| 2002/0055980 A1 | 5/2002 | Goddard |
| 2002/0055982 A1 | 5/2002 | Goddard |
| 2002/0087694 A1 | 7/2002 | Daoud |
| 2002/0122388 A1 | 9/2002 | Behbehani |
| 2002/0143953 A1 | 10/2002 | Aiken |
| 2002/0143965 A1 | 10/2002 | Aiken |
| 2002/0152307 A1* | 10/2002 | Doyle .................... G06F 9/505 709/225 |
| 2003/0023743 A1 | 1/2003 | Raphel |
| 2003/0051055 A1* | 3/2003 | Parrella, Sr. ....... G06F 17/30902 709/246 |
| 2003/0188013 A1 | 10/2003 | Nishikado et al. |
| 2003/0195940 A1 | 10/2003 | Basu |
| 2004/0024853 A1 | 2/2004 | Cates |
| 2004/0024861 A1 | 2/2004 | Coughlin |
| 2004/0031030 A1 | 2/2004 | Kidder |
| 2004/0049598 A1 | 3/2004 | Tucker |
| 2004/0107273 A1 | 6/2004 | Biran |
| 2004/0172470 A1 | 9/2004 | Shiina |
| 2005/0086337 A1 | 4/2005 | Quittek |
| 2005/0102400 A1 | 5/2005 | Nakahara |
| 2005/0188295 A1* | 8/2005 | Konkus ................ G06F 3/0482 715/206 |
| 2005/0198247 A1 | 9/2005 | Perry |
| 2005/0213507 A1 | 9/2005 | Banerjee et al. |
| 2005/0262183 A1* | 11/2005 | Colrain ................ G06F 9/505 709/200 |
| 2006/0062177 A1 | 3/2006 | Asthana |
| 2006/0085680 A1 | 4/2006 | Matsuno |
| 2006/0190579 A1 | 8/2006 | Rachniowski |
| 2006/0294207 A1 | 12/2006 | Barsness |
| 2007/0005801 A1* | 1/2007 | Kumar ................ H04L 63/08 709/238 |
| 2007/0130341 A1 | 6/2007 | Ma |
| 2007/0169049 A1 | 7/2007 | Gingell |
| 2007/0174660 A1 | 7/2007 | Peddada |
| 2007/0226359 A1 | 9/2007 | Gunduc |
| 2007/0260702 A1 | 11/2007 | Richardson |
| 2008/0046596 A1 | 2/2008 | Afergan |
| 2008/0133536 A1* | 6/2008 | Bjorner .................. H03M 7/30 |
| 2008/0228939 A1 | 9/2008 | Samuels |
| 2009/0006541 A1 | 1/2009 | Baba |
| 2009/0024763 A1 | 1/2009 | Stepin et al. |
| 2009/0077233 A1 | 3/2009 | Kurebayashi |
| 2009/0204885 A1 | 8/2009 | Ellsworth |
| 2009/0245122 A1 | 10/2009 | Maiocco |
| 2009/0259736 A1 | 10/2009 | Chang |
| 2009/0328054 A1* | 12/2009 | Paramasivam ......... G06F 9/505 718/105 |
| 2010/0030851 A1 | 2/2010 | Inden |
| 2010/0036956 A1 | 2/2010 | Nishikawa |
| 2010/0070561 A1 | 3/2010 | Dhoolia |
| 2010/0220740 A1 | 9/2010 | Hufferd |
| 2010/0235484 A1 | 9/2010 | Bolan |
| 2011/0106949 A1 | 5/2011 | Patel |
| 2011/0107136 A1 | 5/2011 | Jonnagadla |
| 2011/0122893 A1 | 5/2011 | Kang |
| 2011/0145786 A1 | 6/2011 | Fayed |
| 2011/0161523 A1 | 6/2011 | Erickson |
| 2011/0208808 A1 | 8/2011 | Corbett |
| 2011/0276695 A1 | 11/2011 | Maldaner |
| 2012/0096166 A1 | 4/2012 | Devarapalli |
| 2012/0271964 A1 | 10/2012 | Porter |
| 2013/0054806 A1 | 2/2013 | Francis |
| 2014/0089285 A1* | 3/2014 | Gibbs .................. G06F 17/276 707/706 |

FOREIGN PATENT DOCUMENTS

| | | |
|---|---|---|
| CN | 1285055 C | 11/2006 |
| CN | 101291253 A | 10/2008 |
| CN | 101346972 A | 1/2009 |
| CN | 101755418 A | 6/2010 |
| CN | 102077533 A | 5/2011 |
| EP | 1134658 A2 | 9/2001 |
| GB | 2360369 | 9/2001 |
| JP | 2002163241 | 6/2002 |
| JP | 2004-030204 A | 1/2004 |
| JP | 2006351029 | 12/2006 |
| JP | 2008-040718 A | 2/2008 |
| JP | 2008027388 | 2/2008 |
| JP | 2009193427 | 8/2009 |
| JP | 2010-113495 A | 5/2010 |
| JP | 2011-186810 A | 9/2011 |
| WO | 0207037 | 1/2002 |
| WO | 03105004 | 12/2003 |
| WO | 2004008334 | 1/2004 |
| WO | 2007110942 | 10/2007 |

OTHER PUBLICATIONS

International Searching Authority At the U. S. Patent and Trademark Office, International Search Report and Written Opinion for PCT International Application No. PCT/US2012/057370, May 31, 2013, 17 pages.

International Searching Authority At the U. S. Patent and Trademark Office, International Search Report and Written Opinion for PCT International Application No. PCT/US2012/057373, Feb. 14, 2013, 13 pages.

International Searching Authority At the U. S. Patent and Trademark Office, International Search Report and Written Opinion for PCT International Application No. PCT/US2012/057375, May 24, 2013, 19 pages.

International Searching Authority At the U. S. Patent and Trademark Office, International Search Report and Written Opinion for PCT International Application No. PCT/US2012/057620, Jun. 5, 2013, 22 pages.

Elkstein, How do I handle authentication in REST? Aug. 26, 2011.
Wikipedia, HTTP Compression, No date, 2 pages.
No Author, Method and System for Displaying Graphical Objects in a Command Line Interface (CLI) Terminal, Feb. 18, 2010, 4 pages.

(56) References Cited

OTHER PUBLICATIONS

Office Action issued by United States Patent and Trademark Office on U.S. Appl. No. 13/625,716, mailed May 25, 2016, 13 pages.
Ken St. Cyr, "Load-Balance Ad LOS with Microsoft NLB in 6 Steps", Jun. 23, 2009, Windows IT Pro, 7 pages, "http ://windowsitpro.com/article/network-load-balancing-nlb/load-balance-ad-lds-with-m icrosoft-nlb-in-6-steps-102360".
Office Action issued by United States Patent and Trademark Office on U.S. Appl. No. 13/625,716, mailed Jul. 29, 2014, 19 pages.
Search Report issued by CCPIT for Chinese patent application No. 201280047085.8, dated Aug. 20, 2015, 2 pages.
Office Action issued by United States Patent and Trademark Office for U.S. Appl. No. 13/627,579, dated Oct. 19, 2015, 8 pages.
office Action issued by United States Patent and Trademark Office for U.S. Appl. No. 13/601,428, dated Aug. 27, 2015, 13 pages.
Office Action issued by Japanese Patent Office for Japanese patent application No. 2014-532113, dated Aug. 16, 2016 (4 pages).
Office Action issued by Japanese Patent Office for Japanese patent application No. 2014-532121, dated Aug. 2, 2016 (5 pages).
Office Action issued by Japanese Patent Office for Japanese patent application No. 2014-532114, dated Aug. 23, 2016 (6 pages).
Office Action issued by State Intellectual Property Office of the People's Republic of China for Chinese patent application No. 201280047077.3, dated Aug. 4, 2016 (20 pages).
Office Action issued by State Intellectual Property Office of the People's Republic of China for Chinese patent application No. 201280047076.9, dated Jun. 23, 2016 (27 pages).
Office Action issued by State Intellectual Property Office of the People's Republic of China for Chinese patent application No. 201280047096.2, dated Jun. 30, 2016 (17 pages).

* cited by examiner

SYSTEM AND METHOD FOR PROVIDING A REST-BASED MANAGEMENT SERVICE IN A TRAFFIC DIRECTOR ENVIRONMENT

CLAIM OF PRIORITY

This application is a continuation of U.S. patent application Ser. No. 13/627,646, titled "SYSTEM AND METHOD FOR PROVIDING A REST-BASED MANAGEMENT SERVICE IN A TRAFFIC DIRECTOR ENVIRONMENT", filed Sep. 26, 2012; which claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to software administration tools, for use in administering server configurations, and is particularly related to a system and method for providing a rest-based management service in a traffic director or other type of server environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for providing software administration tools, for use in administering server configurations, such as in a traffic director or other type of server environment. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

In accordance with an embodiment, the system comprises a traffic director having one or more traffic director instances, which is configured to receive and communicate requests, from clients, to origin servers having one or more pools of servers. An administration server can be used to manage the traffic director, including a REpresentational State Transfer (REST) infrastructure and management service which maps REST calls to MBeans or other management components registered on the administration server, for use in managing the traffic director. Embodiments of the invention can also be used with other types of server environment.

DETAILED DESCRIPTION

Figure 1:
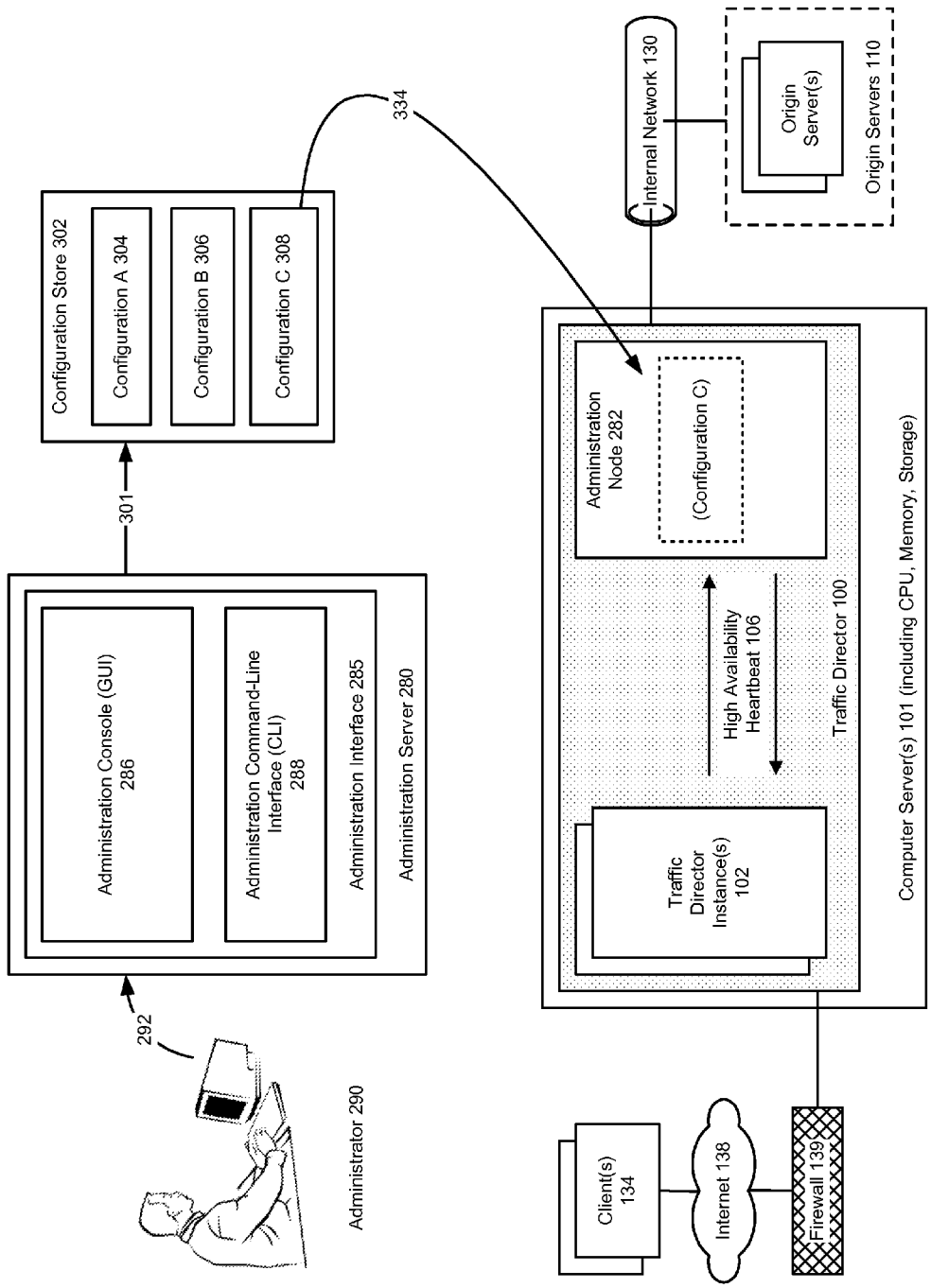
FIG. 1 illustrates a computing environment which includes a server environment, such as a load balancer or traffic director, which can be managed using a rest-based management service, in accordance with an embodiment.

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. It is also desirable to be able to manage or administer such systems efficiently and securely.

Described herein are systems and methods for providing software administration tools for use in administering server configurations, and in particular a system and method for providing a rest-based management service. In accordance with an embodiment, the systems and methods can be used with a server environment such as a traffic director, referred to herein in some embodiments as "Oracle Traffic Director" (OTD), which is provided as a software-based load balancer that can be used to deliver Internet and other traffic to back-end origin servers, such as web servers, application servers, or other resource servers.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs.

GLOSSARY

In accordance with an embodiment, the following terms are used herein. It will be evident that, in accordance with other embodiments, additional and/or different terms can be used.

Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP).

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

FIG. 1 illustrates a computing environment which includes a server environment, such as a load balancer or traffic director, which can be managed using a rest-based management service, in accordance with an embodiment. As shown in FIG. 1, in accordance with an embodiment, a server environment (e.g., a traffic director 100) can be deployed on one or more physical computer servers 101 or similar computing devices that include a processor (CPU), memory, and storage, and can include one or more server instances (e.g., traffic director instances 102), which in turn can communicate with one another using a high-availability heartbeat or similar means 106.

In accordance with an embodiment, the back-end can include one or more origin servers 110. Each of the origin servers can communicate with one another, and with the traffic director, via an internal network 130 such as an Ethernet network. The traffic director can receive requests from clients 134, via the Internet 138, and in the case of many organizations a firewall 139.

In accordance with an embodiment, from an administration perspective, the server environment is designed to be easy to install, configure, and use; and can include a simple, wizard-driven graphical interface, as well as a robust command-line interface, for use by an administrator in managing server instances. At least one of the server instances can be designated an administration node 282. An administration server 280 includes an administration interface 285, which in turn includes one or more of an administration console (GUI) 286 and/or a command line interface 288, that enables an administrator 290 to configure or otherwise administer 292 the server environment or its server instances.

In accordance with an embodiment, a configuration is a collection of configurable elements that determines the run-time behavior of a server instance. A typical configuration may contain, e.g., definitions for listeners on which the traffic director should listen for requests, together with information about servers at the back-end to which the requests should be sent. The server environment, e.g., traffic director, can read the configuration when a server instance starts, and while processing client requests. An administrator can define 301 configurations 304, 306, 308 for server instances, which are stored in a configuration store 302 on the administration server. The administrator can then instantiate a configuration by deploying it 334 on one or more administration nodes.

It will be evident that the example shown in FIG. 1 is provided for purposes of illustration and that, in accordance with other embodiments, different types of server environment, and different deployment scenarios can be used.

REST Infrastructure and Management Service

In accordance with an embodiment, the server environment (e.g., traffic director environment) includes a REpresentational State Transfer (REST) infrastructure and management service, which enables management of the environment, while at the same time allowing flexible evolution of the REST interfaces and the back-end data model. The REST infrastructure maps HTTP REST calls to respective MBeans, or other management components, that are registered on the administration server. In accordance with an embodiment, a Java web application or REST web service can be deployed on the administration server and can expose a set of REST APIs, most of which finally map to their respective MBeans or management components registered on the administration server, while others return web application specific data, e.g., information about a session, or information about a logged-in user.

In accordance with an embodiment, a HTTP request is handled by the REST infrastructure as follows:

GET/POST JSON request->RESTServlet->RESTHandler->JSON response wherein the REST URI space is of the format:

/admin/<action> and wherein the action can be, e.g., a login, logout, list-configs, get-config-prop, or another action. In accordance with an embodiment, a typical REST request/response will then look similar to that shown below:

```
// request
GET /admin/get-config-prop?config=www.example.com HTTP/1.0
X-Auth-Token: 3f8b14d6-fdca-4bdd-b43b-a366de853c69
Cookie: JSESSIONID=91A3BF1B3E32B0FE88330D6385FDB4F8;
Path=/admin;
HttpOnly
// response
HTTP/1.1 200 OK
Server: Oracle-Traffic-Director/11.1.1.6
Content-type: application/json;charset=UTF-8
Content-length: 65
Connection: close
{"platform":"64","temp-path":"/tmp/net-www.example.com-60a02e2e"}
```

Figure 2:
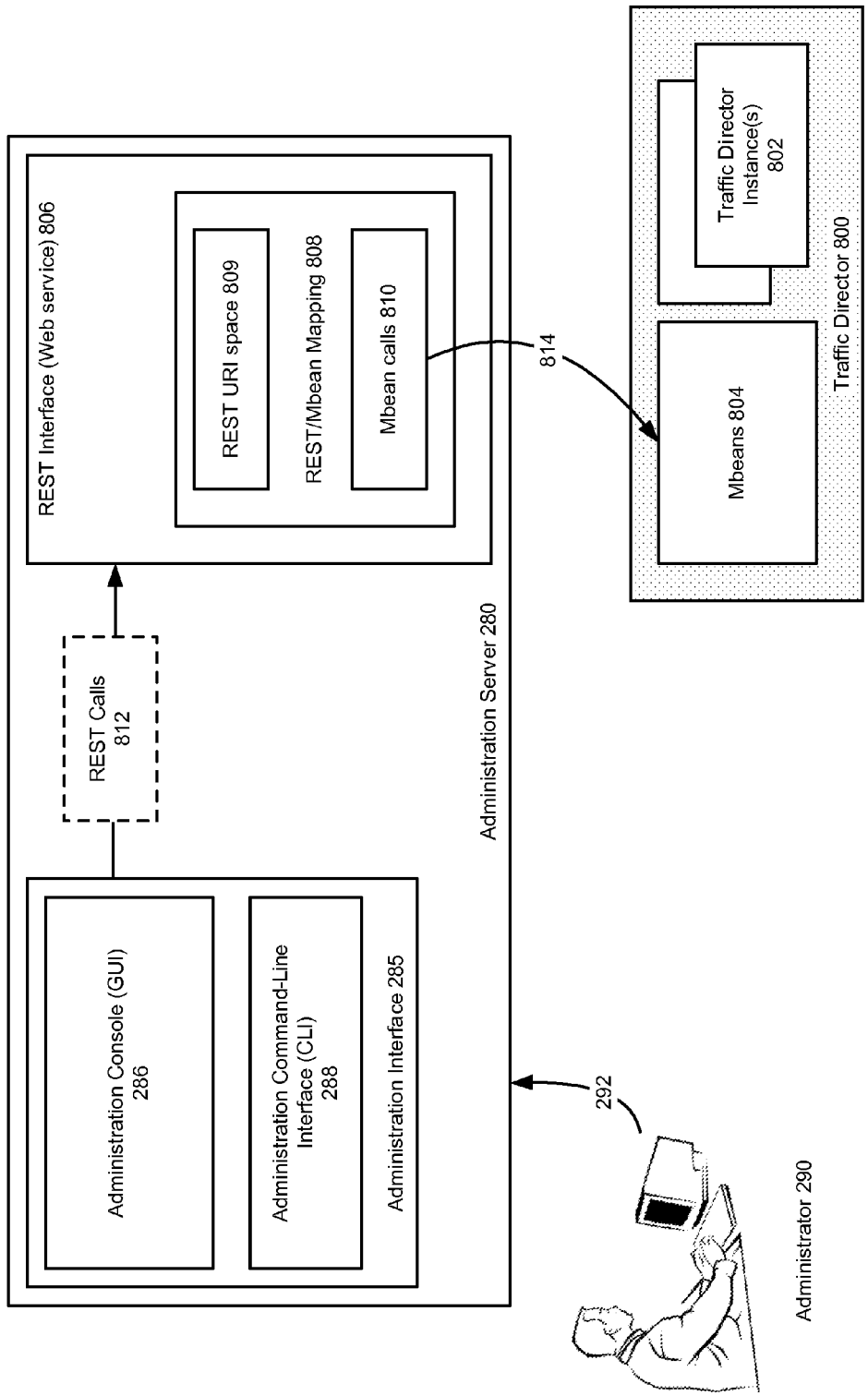
FIG. 2 illustrates a REST interface, in accordance with an embodiment.

FIG. 2 illustrates a REST interface, in accordance with an embodiment. As shown in FIG. 2, a server environment is provided, including a traffic director 800 having one or more traffic director instances 802, wherein the traffic director and its instances can be configured or managed using MBeans 804, or other management components.

As further shown in FIG. 2, an administration server 280 includes an administration interface 285, including one or more of an administration console (GUI) 286 and/or command-line interface 288, which allows an administrator 290 to configure or manage the server environment.

In accordance with an embodiment, the administration server includes a REST interface (e.g., a Java web application or REST web service) 806, which provides a mapping 808 between a REST URI space 809 and respective MBean calls 810. When an administrator using the administration interface, or another entity, communicates a management request as a REST call 812 to the REST interface, the system maps that call to MBean calls 814, for use in configuring or managing the server environment, including, e.g., the traffic director or instances therein.

REST-Based Authentication

In accordance with an embodiment, the system can also support the use of customized HTTP headers to protect the REST web service API from potential Cross-Site Request Forgery (CSRF) exploits. Through the use of customized HTTP headers conveying user-specific tokens, the administration server can assert the authenticity of clients invoking a management operation.

In accordance with an embodiment, most of the REST APIs are protected and hence require authentication, which can be provided through the use of a password-based authentication. For example, a REST API/admin/login can be provided to login using appropriate credentials, e.g., a username and password, or traffic director administration server credentials, such as that shown below:

```
// request
POST /admin/login HTTP/1.0
Content-Type: application/json
Content-Length: 45
{"username":"admin", "password":"<passwd>"}
// response
HTTP/1.1 200 OK
Server: Oracle-Traffic-Director/11.1.1.6
Content-type: text/html
Set-x-auth-token: 3f8b14d6-fdca-4bdd-b43b-a366de853c69
Content-length: 0
Set-cookie: JSESSIONID=91A3BF1B3E32B0FE88330D6385FDB4F8;
Path=/admin; HttpOnly
Connection: close
```

In accordance with an embodiment, the response of the login action includes an X-Auth-Token, which then must be passed with any subsequent requests. This allows the X-Auth-Token header to be used to prevent CSRF attacks:

```
// request
POST /admin/get-config-prop HTTP/1.0
Content-Type: application/json
Content-Length: 28
X-Auth-Token: 3f8b14d6-fdca-4bdd-b43b-a366de853c69
Cookie: JSESSIONID=91A3BF1B3E32B0FE88330D6385FDB4F8;
Path=/admin ; HttpOnly
{"config":"www.example.com"}
// response
HTTP/1.1 200 OK
Server: Oracle-Traffic-Director/11.1.1.6
Content-type: application/json;charset=UTF-8
Content-length: 65
Connection: close
{"platform":"64","temp-path":"/tmp/net-www.example.com-60a02e2e"}
```

Figure 3:
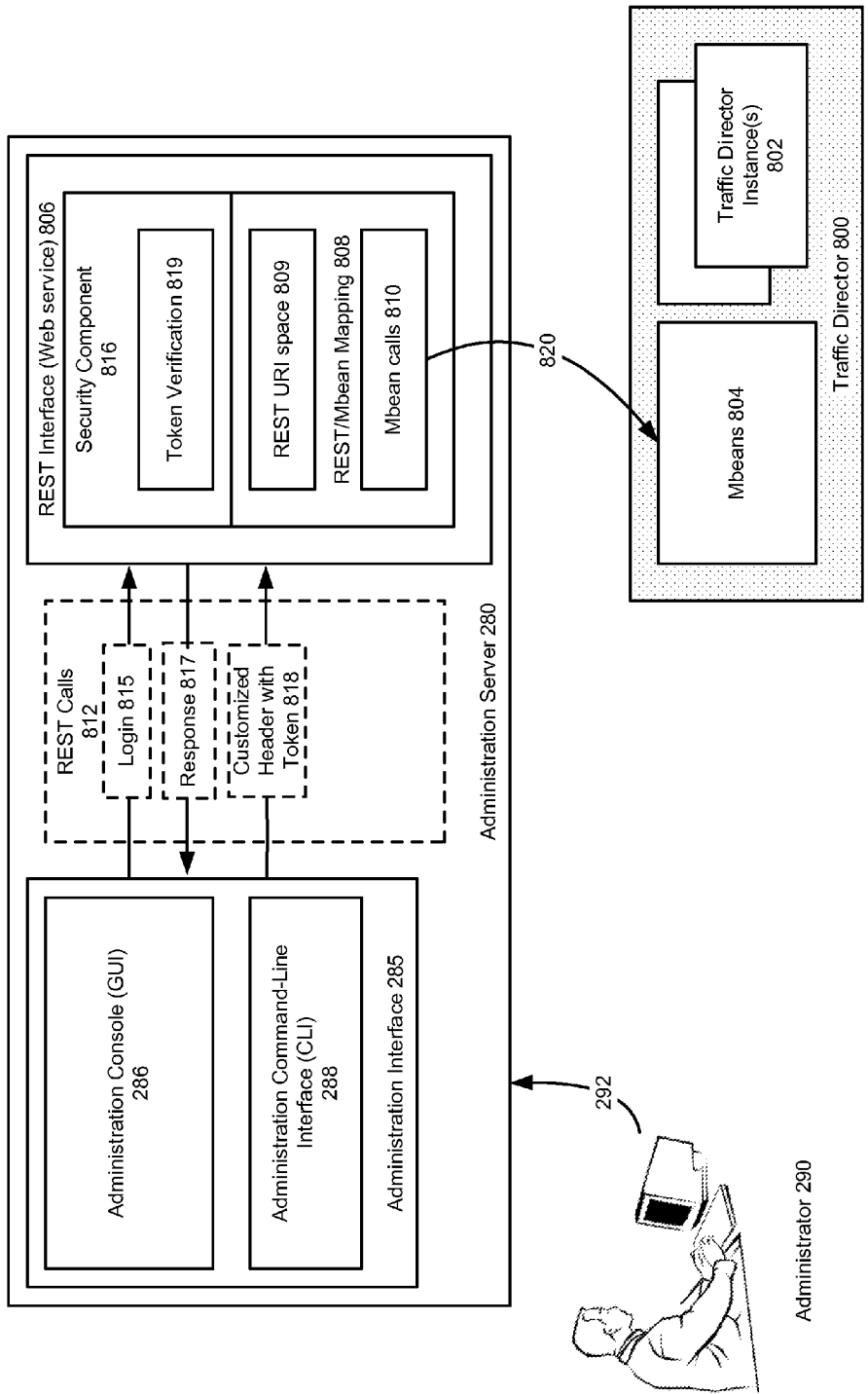
FIG. 3 illustrates use of a REST interface with customized header tokens, in accordance with an embodiment.

FIG. 3 illustrates use of a REST interface with customized header tokens, in accordance with an embodiment. As shown in FIG. 3, a traffic director environment is again provided, including the traffic director 800 having one or more traffic director instances 802, wherein the traffic director and its instances can be configured or managed using mbeans 804, or other management component. The administration server 280 again includes an administration interface 285, including one or more of a traffic director administration console (GUI) 286 and/or a traffic director command-line interface 288.

In accordance with an embodiment, the administration server includes a REST interface (e.g., a Java web application or REST web service) 806, which provides a mapping 808 between a REST URI space 809 and respective MBean calls 810, and also includes a security component 816.

When an administrator using the administration interface, or another entity, communicates a management request as a REST call 812 to the REST interface, they must first login or otherwise authenticate themselves 815 with the security component. In response 817, they receive a token (which in accordance with an embodiment is an X-Auth-Token).

Thereafter, with each management request/REST call to the administrator server, the token must be included as part of the request header 818. The security component can then verify the token 819, prior to passing the management request as an MBean call 820 to the traffic director environment.

Figure 4:
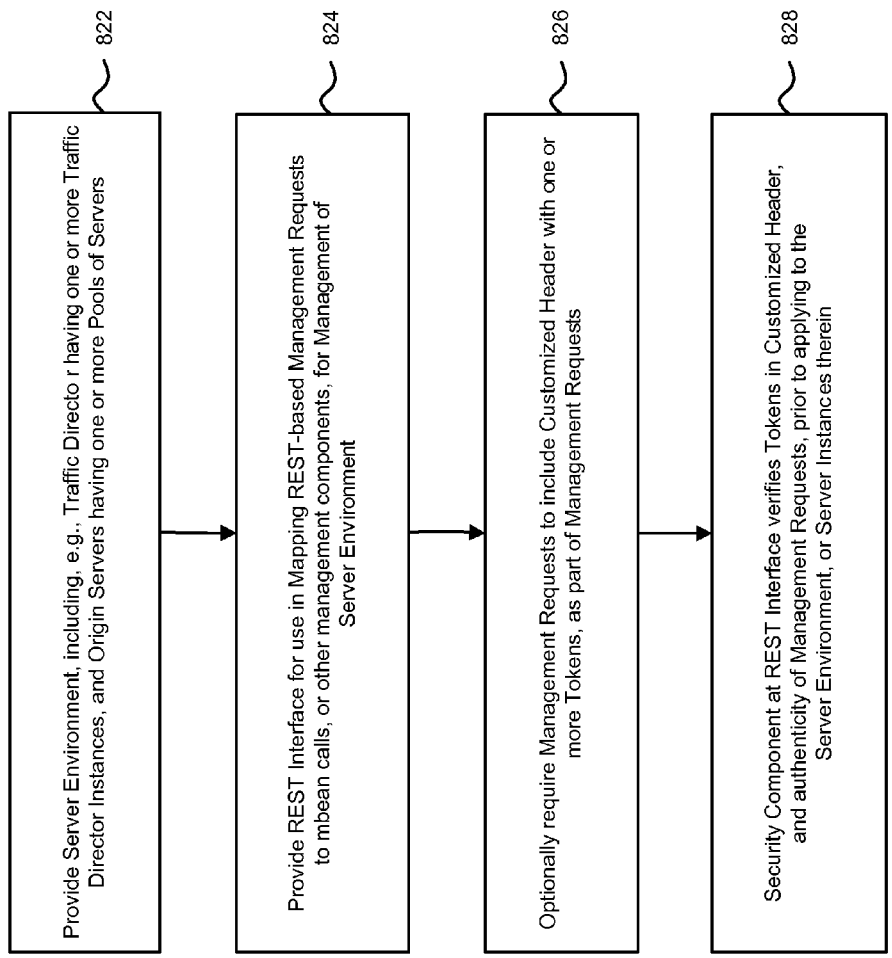
FIG. 4 is a flowchart of a method for using a REST interface, optionally with customized header tokens, in accordance with an embodiment.

FIG. 4 is a flowchart of a method for using a REST interface, optionally with customized header tokens, in accordance with an embodiment. As shown in FIG. 4, at step 822, a server environment (e.g., traffic director environment) is provided, including, e.g., a traffic director having one or more traffic director instances, and origin servers having one or more pools of servers.

At step 824, a REST interface is provided (e.g., as a web service), which maps REST calls to MBean calls, for use in configuring or managing the server environment.

At step 826, depending on the particular embodiment, the system can require that management requests received from clients include a customized header with one or more tokens as part of those management requests.

At step 828, a security component can be provided at the REST interface to check for the presence of the token in the customized header, and to verify the authenticity of the management request, prior to allowing that request to be applied to the server environment, or server instances therein.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing secured management of a network server environment, comprising:

one or more computer servers, including one or more server instances operating thereon, wherein the server instances are managed using one or more management software components provided at the one or more computer servers and associated with the server instances;

an administration server, which is used to manage the server instances, wherein the administration server includes a configuration store having a plurality of defined configurations, when each configuration includes a collection of configurable elements and is deployable to determine a run-time behavior of a server instance, and wherein the management software components are registered with the administration server; and a management service that includes a security component, provided at the administration server, which authenticates calls received from administration interfaces directed to the management software components registered with the administration server, for use in managing the server instances;

wherein the management service is provided as a Representational State Transfer (REST) management service and includes a web service which provides a mapping between a REST URI space and respective calls to the management software components registered with the administration server, and provides a mapping between hypertext transfer protocol (HTTP) calls received at the management service and the management software components registered with the administration server, including that the management service authenticates an entity associated with management requests with the security component, provides a token to be included as part of a request header of subsequent management requests received as HTTP calls to the management service, and upon receipt of a subsequent management request, verifies presence of the token in a request header of the subsequent management request, prior to passing the subsequent management request as a call to the management software components to at least one of configure or manage the server instances.

2. The system of claim 1, wherein the token provided to the entity is used to create a customized request header for use by that entity in calling the management service with the subsequent management request.

3. The system of claim 1, wherein the management service maps HTTP calls, including the customized request header, to the management software components, that are registered with the administration server, for use in managing the one or more server instances.

4. A method of providing secured management of a network server environment, comprising:
- operating, at one or more computer servers, one or more server instances, wherein the server instances are managed using one or more management software components provided at the one or more computer servers and associated with the server instances;
- providing an administration server, which is used to manage the server instances, wherein the administration server includes a configuration store having a plurality of defined configurations, when each configuration includes a collection of configurable elements and is deployable to determine a run-time behavior of a server instance, and wherein the management software components are registered with the administration server; and
- providing a management service that includes a security component, provided at the administration server, which authenticates calls received from administration interfaces directed to the management software components registered with the administration server, for use in managing the server instances;
- wherein the management service is provided as a Representational State Transfer (REST) management service and includes a web service which provides a mapping between a REST URI space and respective calls to the management software components registered with the administration server, and provides a mapping between hypertext transfer protocol (HTTP) calls received at the management service and the management software components registered with the administration server, including
  - authenticating an entity associated with management requests with the security component,
  - providing a to be included as part of a request header of subsequent management requests received as HTTP calls to the management service, and
  - upon receipt of a subsequent management request, verifying presence of the token in a request header of the subsequent management request, prior to passing the subsequent management request as a call to the management software components to at least one of configure or manage the server instances.

5. The method of claim 4, wherein the token provided to the entity is used to create a customized request header for use by that entity in calling the management service with the subsequent management request.

6. The method of claim 4, wherein the management service maps HTTP calls, including the customized request header, to the management software components, that are registered with the administration server, for use in managing the one or more server instances.

7. A non-transitory computer readable medium, including instructions stored thereon which when read and executed by one or more computers cause the one or more computers to perform the steps comprising:
- operating, at one or more computer servers, one or more server instances, wherein the server instances are managed using one or more management software components provided at the one or more computer servers and associated with the server instances;
- providing an administration server, which is used to manage the server instances, wherein the administration server includes a configuration store having a plurality of defined configurations, when each configuration includes a collection of configurable elements that and is deployable to determine a run-time behavior of a server instance, and wherein the management software components are registered with the administration server; and
- providing a management service that includes a security component, provided at the administration server, which authenticates calls received from administration interfaces directed to the management software components registered with the administration server, for use in managing the server instances;
- wherein the management service is provided as a Representational State Transfer (REST) management service and includes a web service which provides a mapping between a REST URI space and respective calls to the management software components registered with the administration server, and provides a mapping between hypertext transfer protocol (HTTP) calls received at the management service and the management software components registered with the administration server, including
  - authenticating an entity associated with management requests with the security component,
  - providing a token to be included as part of a request header of subsequent management requests received as HTTP calls to the management service, and
  - upon receipt of a subsequent management request, verifying presence of the token in a request header of the subsequent management request, prior to passing the subsequent management request as a call to the management software components to at least one of configure or manage the server instances.

8. The non-transitory computer readable medium of claim 7, wherein the token provided to the entity is used to create a customized request header for use by that entity in calling the management service with the subsequent management request.

9. The non-transitory computer readable medium of claim 7, wherein the management service maps HTTP calls, including the customized request header, to the management software components, that are registered with the administration server, for use in managing the one or more server instances.

10. The system of claim 1, wherein the management software components are managed beans.

11. The system of claim 1, wherein the server instances are provided as part of a traffic director environment.

12. The method of claim 4, wherein the management software components are managed beans.

13. The method of claim 4, wherein the server instances are provided as part of a traffic director environment.

14. The non-transitory computer readable medium of claim 7, wherein the management software components are managed beans.

15. The non-transitory computer readable medium of claim 7, wherein the server instances are provided as part of a traffic director environment.

* * * * *

UNITED STATES PATENT AND TRADEMARK OFFICE
CERTIFICATE OF CORRECTION

PATENT NO.         : 9,477,528 B2                                   Page 1 of 1
APPLICATION NO.    : 14/295874
DATED              : October 25, 2016
INVENTOR(S)        : Gupta et al.

It is certified that error appears in the above-identified patent and that said Letters Patent is hereby corrected as shown below:

In the Drawings

On sheet 4 of 4, in FIGURE 4, under Reference Numeral 822, Line 1, delete "Directo r" and insert -- Director --, therefor.

In the Claims

In Column 9, Line 36, in Claim 4, delete "providing a" and insert -- providing a token --, therefor.

In Column 10, Line 6, in Claim 7, delete "that and" and insert -- and --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*